(12) United States Patent
Dang et al.

(10) Patent No.: US 11,923,741 B2
(45) Date of Patent: Mar. 5, 2024

(54) MOTOR STATOR WITH SEMI-STAGGERED WINDING LAYOUT AND SINGLE-SIDED PHASE, NEUTRAL, AND COIL CONNECTION WELDS

(71) Applicant: Rivian IP Holdings, LLC, Plymouth, MI (US)

(72) Inventors: Dang Dinh Dang, Garden Grove, CA (US); Logan Noel Balliett, Los Angeles, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 94 days.

(21) Appl. No.: 17/539,376

(22) Filed: Dec. 1, 2021

(65) Prior Publication Data

US 2023/0170752 A1    Jun. 1, 2023

(51) Int. Cl.
*H02K 3/28* (2006.01)
*B60K 1/00* (2006.01)

(52) U.S. Cl.
CPC ...... *H02K 3/28* (2013.01); *B60K 1/00* (2013.01)

(58) Field of Classification Search
CPC ........................................................ H02K 3/28
See application file for complete search history.

(56) References Cited

U.S. PATENT DOCUMENTS

2021/0218305 A1    7/2021 Tang et al.

FOREIGN PATENT DOCUMENTS

| CN | 111106692 A | * | 5/2020 |
| KR | 1020210117056 A | | 9/2021 |

OTHER PUBLICATIONS

Apr. 18, 2023 Search and Examination Report issued in corresponding International Application No. GB2217044.3.

* cited by examiner

*Primary Examiner* — Ramon M Barrera
(74) *Attorney, Agent, or Firm* — Clements Bernard Walker; Christopher L. Bernard

(57) ABSTRACT

A motor stator for a motor is disclosed. The motor stator includes a stator body and a plurality of windings. The stator body includes a weld end, a crown end, and a plurality of slots arranged circumferentially and extending axially therethrough between the weld end and the crown end. Each winding including a phase lead, a neutral lead, and a plurality of coils. The plurality of coils include a same-layer lead coil including two legs that spans across multiple slots of the plurality of slots and that are inserted into respective slots at a same layer thereof. The same-layer lead coil positions the phase lead at the weld end. The neutral lead and welds joining the plurality of coils are all positioned at the weld end.

17 Claims, 14 Drawing Sheets

MOTOR STATOR WITH SEMI-STAGGERED WINDING LAYOUT AND SINGLE-SIDED PHASE, NEUTRAL, AND COIL CONNECTION WELDS

INTRODUCTION

The present disclosure generally relates to electric motors. More particularly, the present disclosure relates to a motor stator of an electric motor that includes a semi-staggered winding layout and single-sided phase, neutral, and coil connection welds.

Motor stators include multiple windings therein which require a significant number of welds, coil types, and the like for the formation thereof. Due to the significant amount of coil types and welds that need to be formed, the manufacturing process is time consuming. Further, each weld is a potential for resistive loss and a potential failure point for the windings.

The present introduction is provided as illustrative environmental context only and should not be construed as being limiting in any manner. The principles of the present disclosure may be applied in other environmental contexts equally.

SUMMARY

The present disclosure generally provides a semi-staggered winding layout where corresponding windings of a given phase are offset from one another by one slot. Each winding includes a same-layer lead coil at the end thereof that includes the phase lead, the same-layer lead coil extends the winding length at the end that includes the phase lead such that the phase lead terminates on a weld end of the motor stator/stator body. The neutral lead is also configured to terminate on a weld end of the motor stator/stator body. As such, all connections/welds of the stator motor are formed on the same (weld end) side of the motor stator, which simplifies the manufacturing process by eliminating the need to fixture coil welds on both sides of the stack and reducing epoxy application to a single step. Further, the semi-staggered winding layout with the same-layer lead coils eliminates weld connections and reduces the number of unique coil types as compared to other motor stator configurations, reducing potential for resistive losses at these weld points as well as eliminating these potential failure points.

In one illustrative embodiment, the present disclosure provides a motor stator for a motor. The motor stator includes a stator body and a plurality of windings. The stator body includes a weld end, a crown end, and a plurality of slots arranged circumferentially and extending axially therethrough between the weld end and the crown end. Each winding including a phase lead, a neutral lead, and a plurality of coils. The plurality of coils include a same-layer lead coil including two legs that spans across multiple slots of the plurality of slots and that are inserted into respective slots at a same layer thereof. The same-layer lead coil positions the phase lead at the weld end. The neutral lead and welds joining the plurality of coils are all positioned at the weld end.

In another illustrative embodiment, the present disclosure provides an electric axle. The electric axle includes a motor and a drive member. The motor includes a motor rotor and the motor stator. The motor stator includes a stator body and a plurality of windings. The stator body includes a weld end, a crown end, and a plurality of slots arranged circumferentially and extending axially therethrough between the weld end and the crown end. Each winding including a phase lead, a neutral lead, and a plurality of coils. The plurality of coils include a same-layer lead coil including two legs that spans across multiple slots of the plurality of slots and that are inserted into respective slots at a same layer thereof. The same-layer lead coil positions the phase lead at the weld end. The neutral lead and welds joining the plurality of coils are all positioned at the weld end. The drive member is coupled to the motor rotor.

In a further illustrative embodiment, the present disclosure provides a vehicle. The vehicle includes an electric axle, a drive member, and a wheel. The electric axle includes a motor. The motor includes a motor rotor and the motor stator. The motor stator includes a stator body and a plurality of windings. The stator body includes a weld end, a crown end, and a plurality of slots arranged circumferentially and extending axially therethrough between the weld end and the crown end. Each winding including a phase lead, a neutral lead, and a plurality of coils. The plurality of coils include a same-layer lead coil including two legs that spans across multiple slots of the plurality of slots and that are inserted into respective slots at a same layer thereof. The same-layer lead coil positions the phase lead at the weld end. The neutral lead and welds joining the plurality of coils are all positioned at the weld end. The drive member is coupled to the motor rotor. The wheel is coupled to the drive member and is configured to be driven thereby.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure generally provides a semi-staggered winding layout where corresponding windings of a given phase are offset from one another by one slot. Each winding includes a same-layer lead coil at the end thereof that includes the phase lead, the same-layer lead coil that extends the winding length at the end that includes the phase lead such that the phase lead terminates on a weld end of the motor stator/stator body. The neutral lead is also configured to terminate on a weld end of the motor stator/stator body. As such, all connections/welds of the stator motor are formed on the same (weld end) side of the motor stator, which simplifies the manufacturing process by eliminating the need to fixture coil welds on both sides of the stack and reducing epoxy application to a single step.

As will be described below in further detail, in various embodiments, each winding includes two winding segments connected in series by a same-layer jumper coil. The winding segments are semi-staggered (the legs are in the same layer and offset by one slot) and extend in opposing azimuthal/circumferential directions. One of the winding segments includes the phase lead and the same-layer lead coil that extends beyond the staggered layout. The combination of this semi-staggered winding layout with the same-layer lead coils eliminates weld connections and reduces the number of unique coil types as compared to other motor stator configurations, reducing potential for resistive losses at these weld points as well as eliminating these potential failure points.

Figure 1:
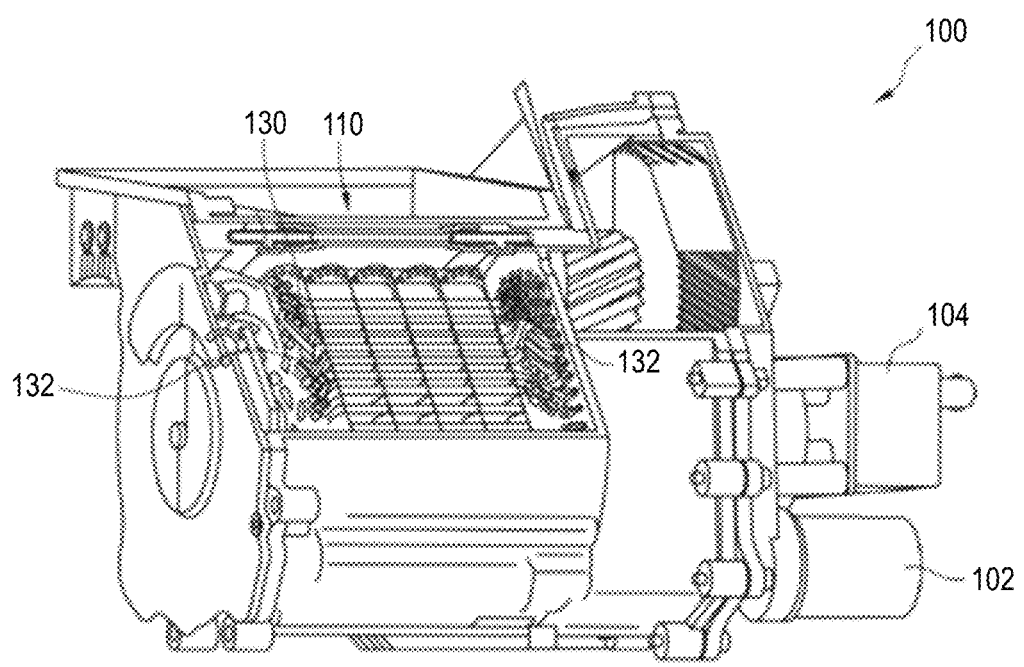
FIG. 1 is a is a perspective view of an electric axle in accordance with an embodiment of the present disclosure.
Figure 2:
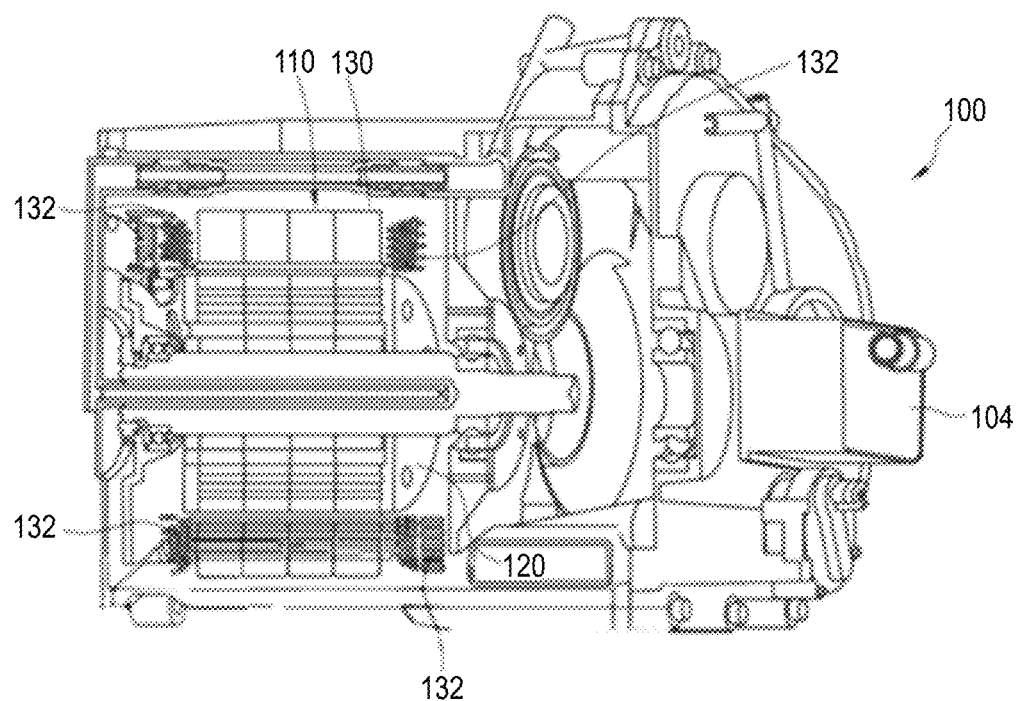
FIG. 2 is a perspective view in partial cut-away view of the electric axle of FIG. 1.

FIG. 1 is a is a perspective view of an electric axle 100. FIG. 2 is a perspective view in partial cut-away view of the electric axle of FIG. 1. Referring now to FIGS. 1-2, in various the electrical axle (e-axle) 100 is that of an electric motor for an electric vehicle. It will be appreciated that the example of the e-axle 100 for an electric vehicle is given by way of illustration only and not of limitation. It will also be appreciated that no such limitation of the e-axle 100 for an electric vehicle is intended and is not to be inferred.

The e-axle 100 includes a motor 110. It will be appreciated that the motor 110 may be any type of electrical motor as desired for a particular application. For example, in some embodiments the motor 110 may be an alternating current (AC) motor and in some other embodiments the motor 110 may be a direct current (DC) electrical motor. In embodiments in which the motor 110 is an AC motor, the motor 110 may be any type of AC motor as desired for a particular application, such as without limitation induction motors (also known as asynchronous motors) either single phase or polyphase and synchronous motors either reluctance or hysteresis. In embodiments in which the motor 110 is a DC motor, the motor 110 may be any type of DC motor as desired for a particular application, such as without limitation permanent magnet DC motors, series DC motors, shunt DC motors, and compound DC motors. In the interest of brevity, non-limiting, illustrative examples of an AC motor for the motor 110 are provided herein for purposes of illustration only and not of limitation. However, it is again emphasized that the motor 110 is not limited to an AC motor (of any type) and, in some embodiments, may be a DC motor.

The motor 110 includes a motor stator 130 and a motor rotor 120. The motor rotor 120 is adapted to rotate relative to the motor stator 130.

In various embodiments, the e-axle also includes an oil pump, an oil filter 102, and a heat exchanger 104. In various embodiments, the oil pump is fluidly coupled to an oil reservoir and adapted to draw oil out of the oil reservoir. The oil pump may be any type of suitable oil pump as desired for a particular application. The oil is pumped through the filter 102 and through the heat exchanger 104 before being delivered to the motor stator 130, such as to the windings 131 of the motor stator 130. In various embodiments, the oil filter 103 is configured to filter oil moving from the oil pump and to motor 110. The oil filter 102 may be any type of suitable oil filter as desired for a particular application.

In various embodiments, the heat exchanger 104 is adapted to receive heated oil from the oil pump and reject heat from the oil before supplying the oil back to the motor 110. The heat exchanger 104 may be any type of heat exchanger as desired for a particular application, such as without limitation a tube-and-shell heat exchanger, a cross-flow heat exchanger, a counter-flow heat exchanger, a plate heat exchanger, and the like.

Figure 3:
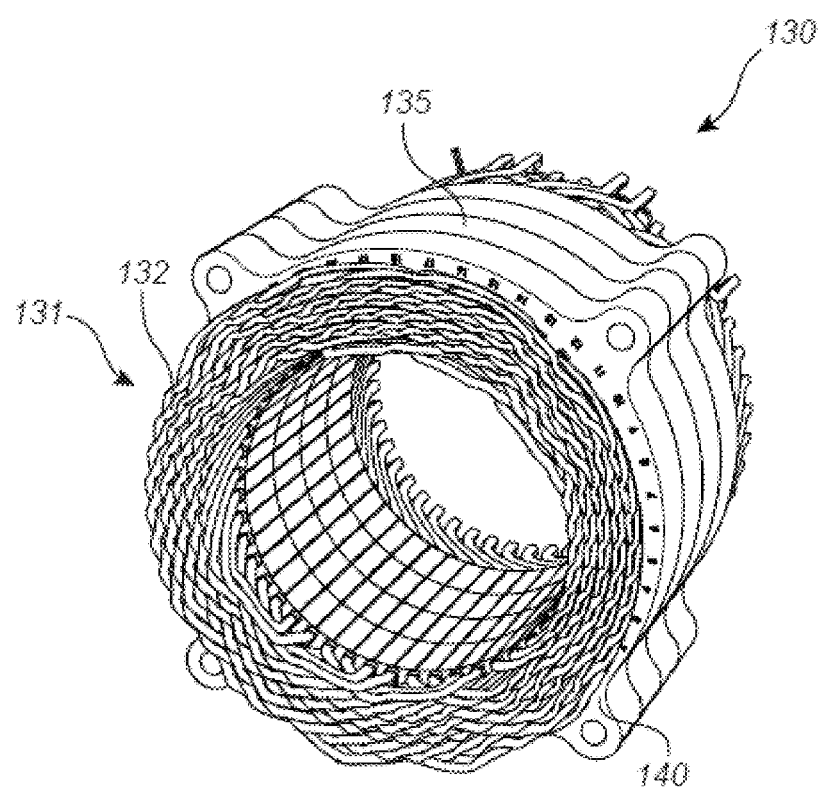
FIG. 3 is a perspective view of a crown end of a motor stator in accordance with an embodiment of the present disclosure.
Figure 4:
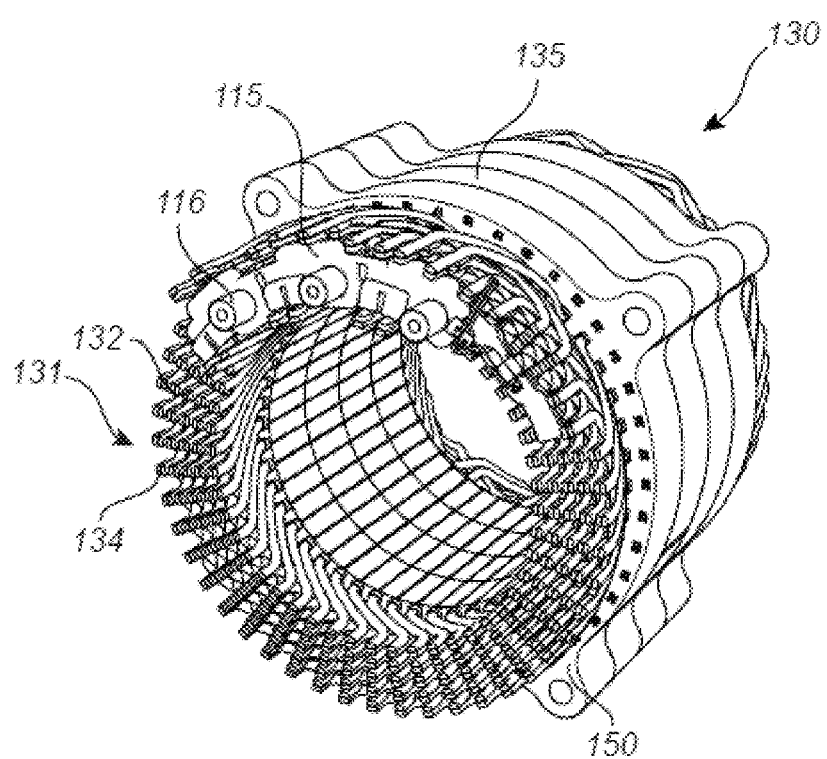
FIG. 4 is a perspective view of a weld end of a motor stator of FIG. 3.
Figure 5:
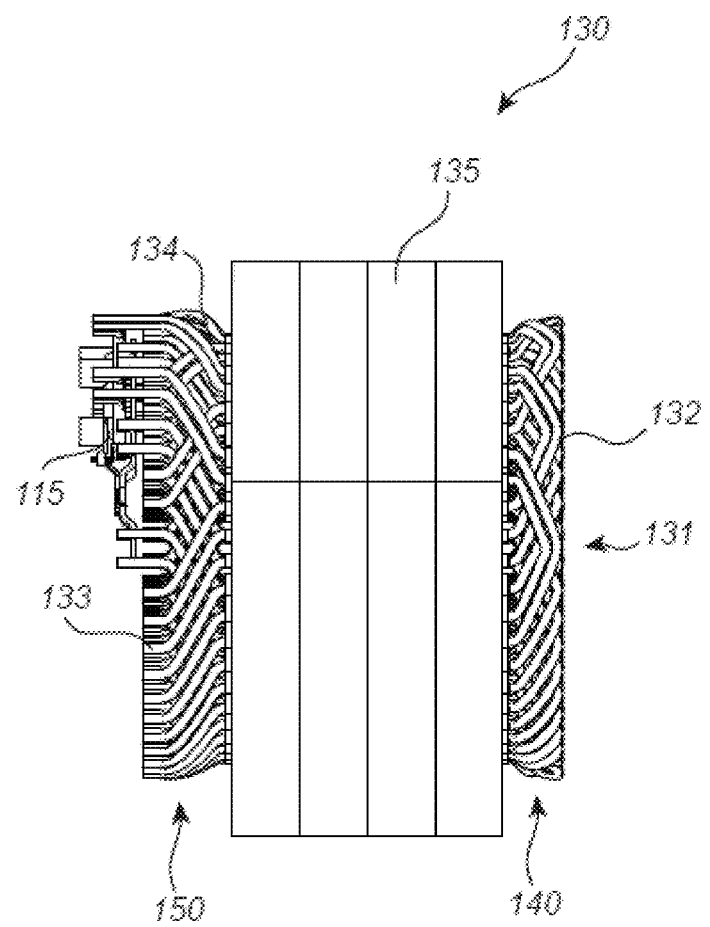
FIG. 5 is a side view of the motor stator of FIG. 3.

FIG. 3 is a perspective view of a crown end 140 of a motor stator 130 in accordance with an embodiment of the present disclosure. FIG. 4 is a perspective view of a weld end 150 of a motor stator 130 of FIG. 3. FIG. 5 is a side view of the motor stator 130 of FIG. 3. Referring to FIGS. 3-5, in various embodiments, the motor stator 130 includes a stator body 135, a weld end 150, a crown end 140, windings 131, and a busbar 115. In embodiments, the busbar includes terminals 116.

In various embodiments, the motor stator 130 includes a semi-staggered phase layout that includes same-layer lead coils in the windings 131 that result in all electrical pathways beginning and ending on the weld end 150 of the motor stator 130. As such, as can be seen in FIGS. 4 and 5, all welds of the motor stator 130, including welds 133 joining ends of coils together to form the windings 131 and welds to the busbar 115, and in particular, the electrical connections to the terminals 116, are formed on the weld end 150. As can be seen in FIG. 3, in the embodiment illustrated, the crown end 140 does not include any welds.

In embodiments, the terminals 116 are configured to be coupled to respective phases (e.g., A, B, and C) of the motor 110 (e.g., three-phase, four-pole as illustrated). The stator body 135 includes multiple slots (e.g., 48 circumferentially positioned slots arranged between a plurality of stator teeth, Refer to FIG. 6), each slot including multiple layers (refer to FIG. 6). The number of layers in a winding layout is defined by the number of conductors in each slot (e.g., stacked radially). In some arrangements, every conductor constitutes one layer. In the embodiment illustrated, the slots include ten layers, where the layers are positioned radially (refer to FIG. 6).

In various embodiments, each winding 131 includes multiple coils 132 welded together, with the welds 133 positioned and being formed on the weld end 150 of the motor stator 130. In embodiments, the coils 132 are wires, such as hairpins. Each coil 132 generally includes two legs 134, where the coil 132 is inserted from the crown end 140 and each leg of the coil 132 is inserted into one of the slots at one of the layers thereof and extends axially through the stator body 135 such that the lead end thereof extends from the from the stator body 135 at the weld end 150. Multiple coils 132 are arranged in the slots (e.g., meeting each other at welds 134). For example, a coil 132 may include two legs 134 configured to fit into two respective slots (i) at a radial position (e.g., the two legs configured to fit in a first layer and second layer, respectively, forming a layer pair such as 1-2, 3-4, 5-6, 7-8, 9-10), and (ii) across a predetermined pitch (e.g., number-of-slots width of the coil 132). As such, in various embodiments, with all of the coils 132 inserted with lead ends extending out of the weld end 150 of the stator body 135, all welds are formed on the weld end 150 including the connections to the busbar 115.

Illustrative windings B1, B2, B3, and B4 are shown in isolation for purposes of clarity in FIGS. 7-10, and an illustrative wiring schematic of some phases of motor stator 130 is shown in FIGS. 11-14 (e.g., for four semi-staggered windings B1, B2, B3, and B4). In some embodiments, the coils 132 include standard coils (e.g., coils 132 having a common shape) extending across a span and layer pair, and a same-layer winding jumper to connect forward windings with reverse direction windings. The coils 132 also include the same-layer lead coils.

The winding pitch (or "span") refers to the number of slots one leg 134 of a coil 132 is from the other leg 134 of the coil 132. For example, a coil 132 may extend a "full pitch," which is where the number of slots the coil 132 covers is equal to number of slots divided by number of poles (e.g., typically an integer for integral slot machines). The coil 132 may extend a "short pitch," often referred to as a "short," which is where the number of slots covered by the coil 132 is less than the full pitch. The coil 132 may also extend a "long pitch," often referred to as a "long," which is where the number of slots covered by the coil 132 is greater than the full pitch. Many winding arrangements, when connecting windings 131 in parallel, require coils 132 in every layer to make several pitches: standard pitch (full pitch); short pitch; and (sometimes) long pitch.

In various embodiments, the windings 131 include forward and reverse windings that are connected in series. For example, the forward and reverse windings of the present disclosure may either occupy all the slots in a layer or partially occupy the slots in every layer (e.g., depending on the number of parallel connections, refer to FIG. 6). A forward winding can be connected (e.g., via a same-layer jumper) to a reverse winding, the forward and reverse windings complementing each other in a semi-staggered manner. The approach of the present disclosure utilizes standard shapes (e.g., full pitch coils) in layer pairs, thus reducing the number of different shapes in the winding layouts. For example, a same winding layout can apply to all of the forward winding, and after a same-layer jump, is connected to the reverse winding having a semi-staggered winding layout. The combination of the forward and the reverse windings can make the winding fully balanced, reducing the number of coil shapes. Further, as will be illustrated in further detail below, short and long same-layer lead coils are positioned at a phase lead end of the windings that ensure that the phase leads are on the weld end 150 of the motor stator 130.

Figure 6:
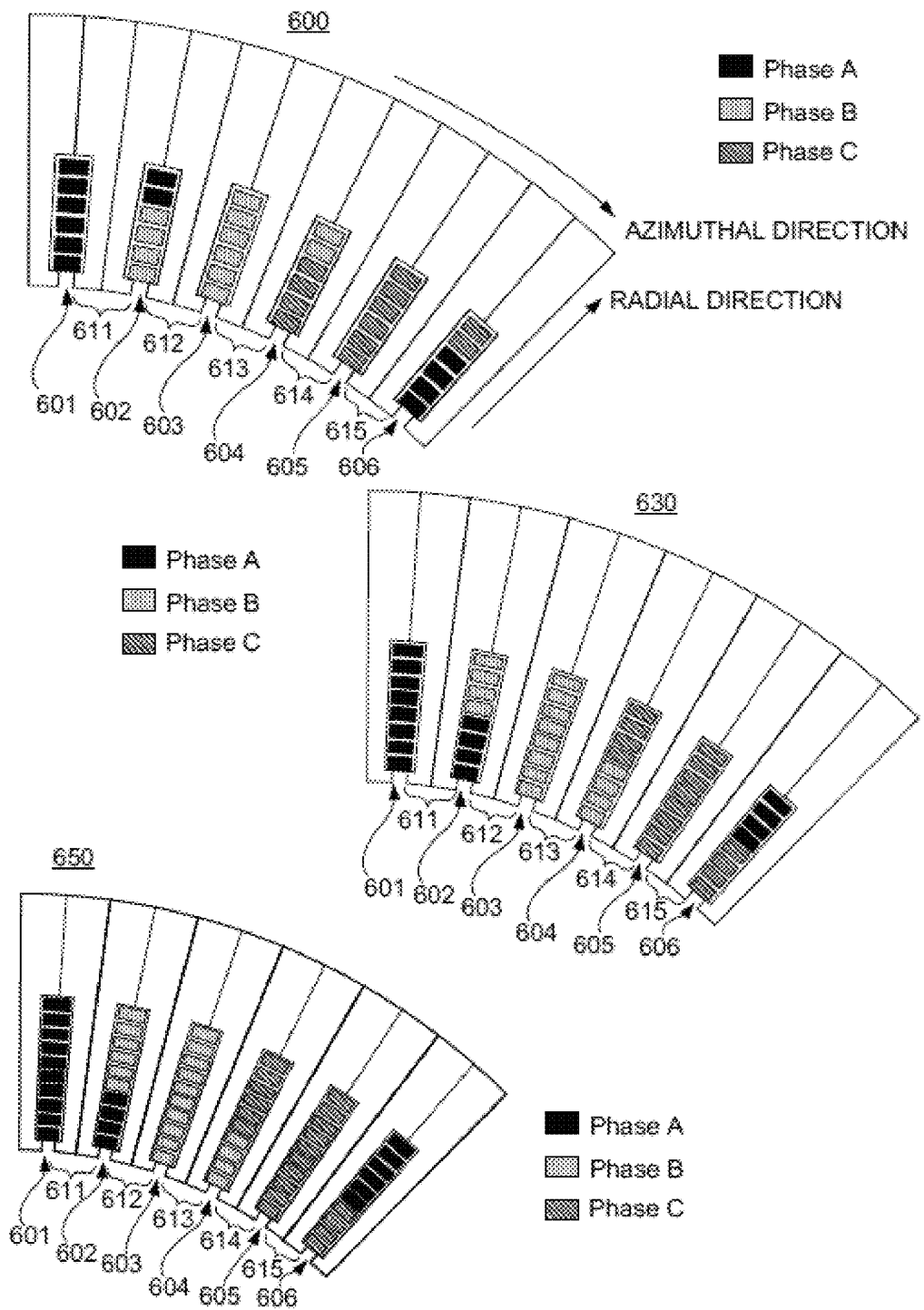
FIG. 6 is a schematic diagram of slot arrangements having different numbers of conductor layers, in accordance with some embodiments of the present disclosure.

FIG. 6 is a schematic diagram of slot arrangements having different numbers of conductor layers, in accordance with some embodiments of the present disclosure. In particular, FIG. 6 illustrates a portion of three end views (e.g., panels 600, 630, and 650) of illustrative slot arrangements of the motor stator 160 having different numbers of conductor layers, in accordance with some embodiments of the present disclosure.

Referring to panel 600, a slot arrangement with six conductor layers is illustrated (six conductors per slot). Referring to panel 630, a slot arrangement with eight conductor layers is illustrated (eight conductors per slot). Referring to panel 650, a slot arrangement with ten conductor layers is illustrated (ten conductors per slot). For reference, an azimuthal direction (e.g., the direction of slot indexing) and a radial direction (e.g., direction of layer indexing) are indicated in each of panels 600, 630, and 650. The azimuthal direction in the embodiments illustrated extends in a circumferential direction (such as in a clockwise direction while viewing the end of the motor stator 130 illustrated). In the embodiment illustrated, the layers of slots 601-605 are indexed in the radial outward direction. A coil 132 (of the windings 131 that has the same layer is thus a coil that passes through two different slots 601-606 while also passing at the same radially indexed position (or layer).

In each of panels 600, 630, and 650, several windings, such as windings 131 of FIGS. 3-5, are illustrated for three phases (e.g., with parts of phase A repeating, but with the opposite current flow orientation). As illustrated, each arrangement of panels 600, 630, and 650 includes slots 601-606, and stator teeth 611-615 arranged between adjacent slots. In each of panels 600, 630, and 650, several windings are illustrated for three phases (e.g., with parts of phase A repeating, but with the opposite current flow orientation). As illustrated in each of panels 600, 630, and 650, the windings for each phase are distributed between three of the slots shown, where slot is shared with other phases for two of the three slots. As illustrated, windings of Phase A of a first polarity (e.g., current into or out of the page, as illustrated) are included in slots 601 and 602, and windings of Phase A having an opposite polarity are included in slot 606. As illustrated, windings of Phase B of a first polarity are included in slots 602, 603, and 604. As illustrated, windings of Phase C of a first polarity are included in slots 604, 605, and 606. Staggering of the windings between three slots among the layers (e.g., the radial staggering of Phase A windings between slots 601, 602, and 606 in panel 600, and Phases B and C as well) can lower the fifth and the seventh order winding harmonics, resulting in lower torque ripple, which can be a source of motor noise. In some embodiments, not illustrated in FIG. 6, the winding of each phase may be distributed in two slots where there will be no sharing of phases within each of these slots. To illustrate, the latter may be preferred for manufacturing reasons but at the expense of higher spatial harmonics in the motor in some circumstances.

Figure 7:
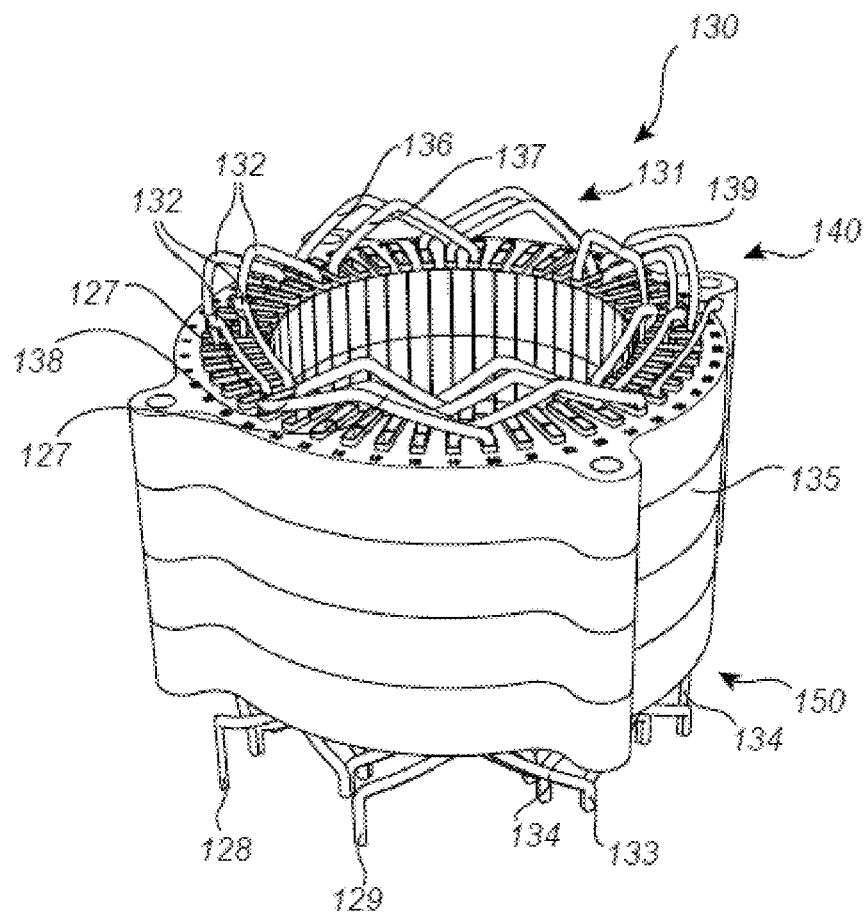
FIG. 7 is a perspective view of the motor stator highlighting a first phase winding thereof in accordance with an embodiment of the present disclosure.
Figure 8:
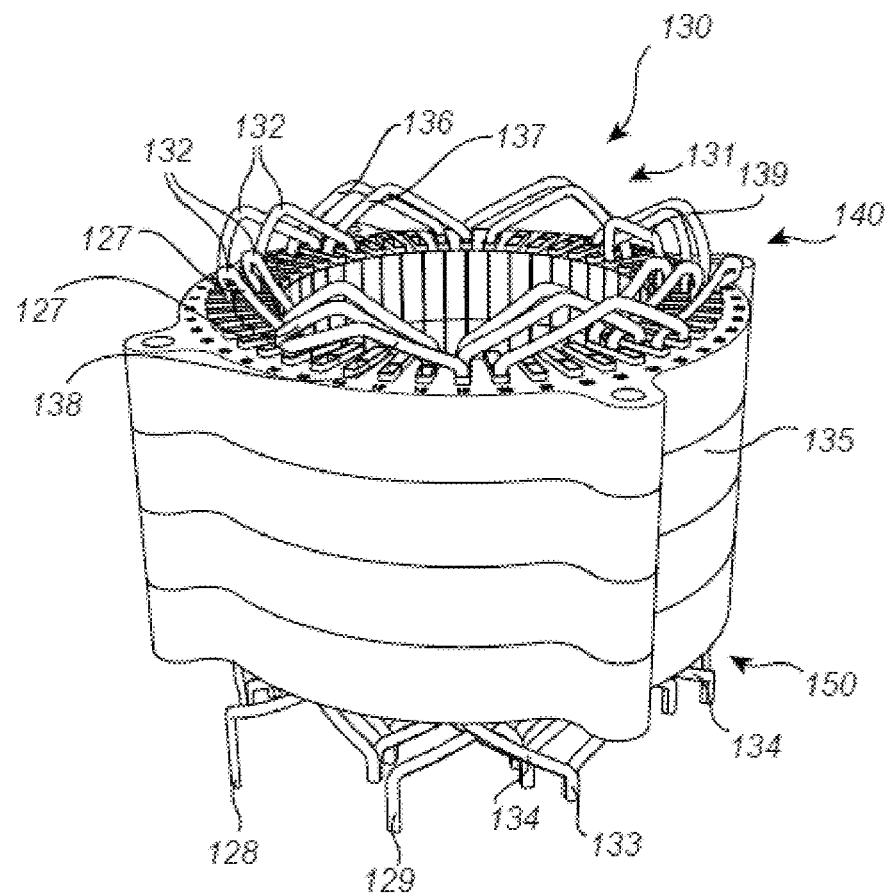
FIG. 8 is a perspective view of the motor stator highlighting a second phase winding thereof in accordance with an embodiment of the present disclosure.
Figure 9:
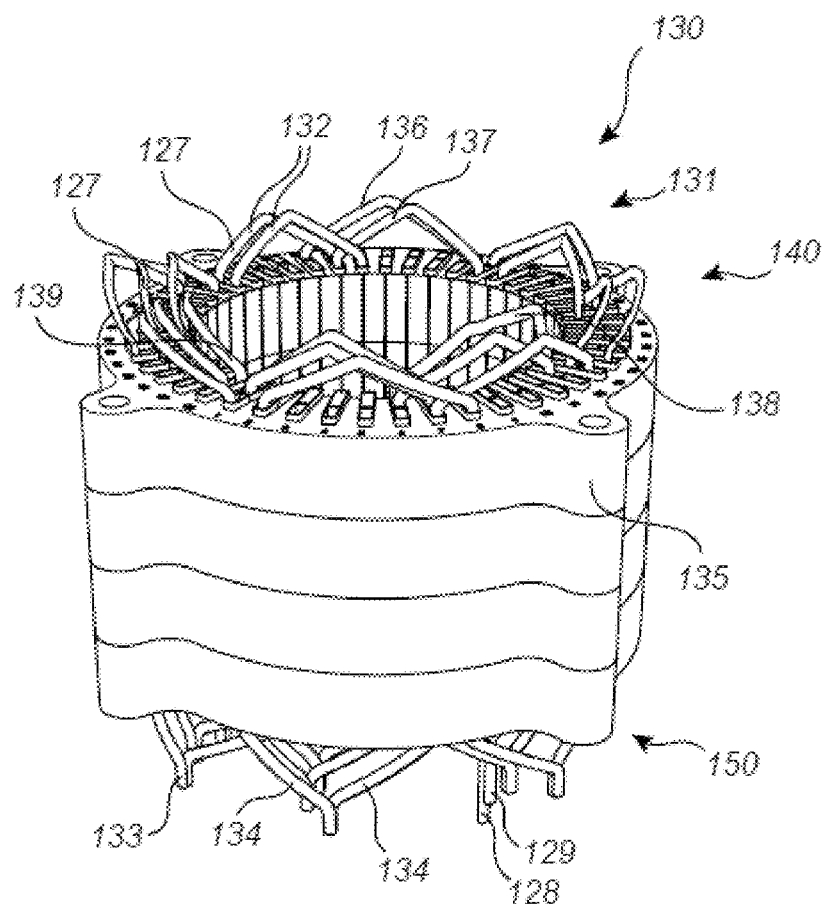
FIG. 9 is a perspective view of the motor stator highlighting a third phase winding thereof in accordance with an embodiment of the present disclosure.
Figure 10:
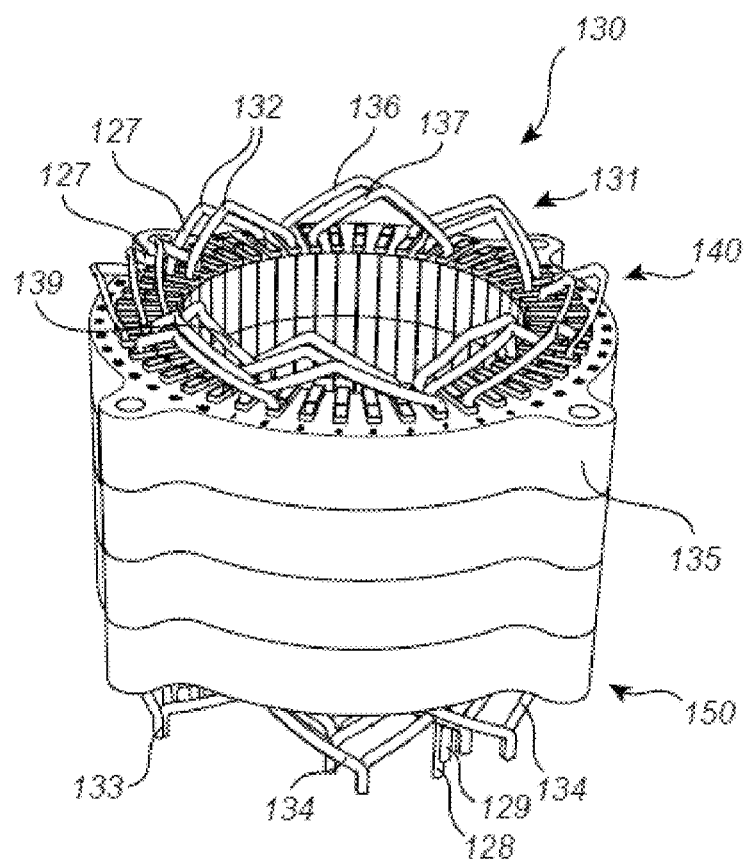
FIG. 10 is a perspective view of the motor stator highlighting a fourth phase winding thereof in accordance with an embodiment of the present disclosure.

FIG. 7 is a perspective view of the motor stator 130 highlighting a first phase winding 131 thereof in accordance with an embodiment of the present disclosure. FIG. 8 is a perspective view of the motor stator 130 highlighting a second phase winding 131 thereof in accordance with an embodiment of the present disclosure. FIG. 9 is a perspective view of the motor stator 130 highlighting a third phase winding 131 thereof in accordance with an embodiment of the present disclosure. FIG. 10 is a perspective view of the motor stator 130 highlighting a fourth phase winding 131 thereof in accordance with an embodiment of the present disclosure. Referring to FIGS. 7-10, windings (131) B1 (first phase winding, FIG. 7), B2 (second phase winding, FIG. 8), B3 (third phase winding, FIGS. 9), and B4 (fourth phase winding, FIG. 10) of phase B are illustrated in isolation in FIGS. 7-10 respectively.

In various embodiments, each of the windings 131 includes a forward winding segment 136, a reverse winding segment 137, a same-layer jumper coil 139, a same-layer lead coil 138, a phase lead 128, and a neutral lead 129. The forward winding segment 136 is wound in a first azimuthal/circumferential direction and the reverse winding segment 137 is wound in a second azimuthal/circumferential direction, opposite the first azimuthal/circumferential direction. The forward winding segment 136 and reverse winding segment 137 are connected via a same-layer jumper coil 139. The same-layer jumper coil 139 can include a standard, long, and short pitch with each leg of the same-layer jumper coil 139 being slotted in a respective slot at a same layer thereof. Each of the forward winding segment 136 and the reverse winding segment 137 are formed of multiple coils 132 joined together, such as via welding, at the weld end 150.

In various embodiments, the forward winding segment 136 and the reverse winding segment 137 are semi-staggered, such that the legs of coils 132 for the reverse winding segment 137 are clocked one slot relative to the legs of corresponding coils 132 for the forward winding segment 136.

The same-layer lead coil 138 for each winding 131 is positioned at an end of the winding 131, such as adjoining the phase lead 128. The same-layer lead coil 138 is configured such that each phase's electrical pathway starts and ends (the phase leads 128 and the neutral leads 129) on the weld end 150. As such, in embodiments, each winding 131 includes a phase lead 128, a neutral lead 129, and multiple coils 132. The coils 132 each include a same-layer lead coil 138 that includes two legs 134 that spans across multiple slots and that are inserted into respective slots at a same layer thereof. Again, the same-layer lead coil 138 positions the phase lead 128 at the weld end 150. The neutral lead 129 and the welds 133 joining the coils 132 are all positioned at the weld end 150. By keeping all connections/welds on the same side, the manufacturing process is greatly simplified as this eliminates the need to fixture coil connections/welds on both sides of the stack and can reduce epoxy application to a single step.

In some embodiments, each of the windings 131 (B1, B2, B3, B4) includes jumper coils 127 that are adapted to enable the semi-staggered azimuthal shift. In particular, one jumper coil 127 causes the shift for the forward winding segment 136, while the other causes the shift for the reverse winding segment 137. In the embodiment illustrated, the jumper coils 127 each span five slots.

Figure 11:
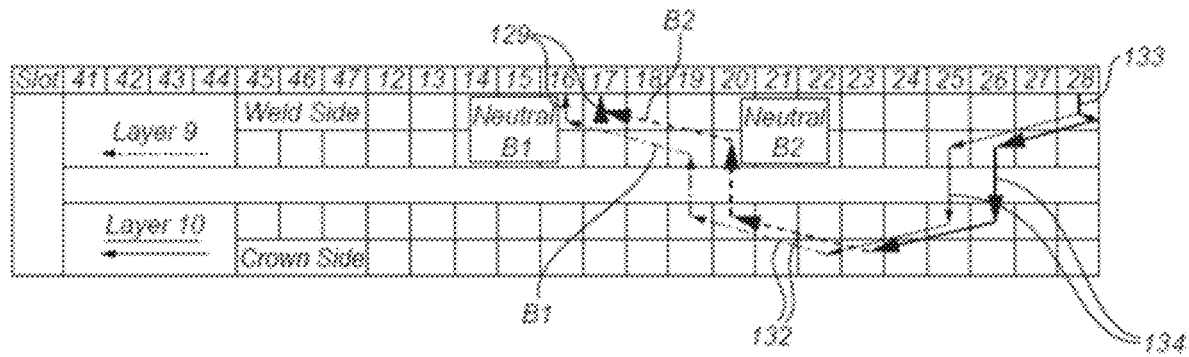
FIG. 11 is a winding diagram illustrating neutral leads of the first and second phase windings in accordance with an embodiment of the present disclosure.
Figure 12:
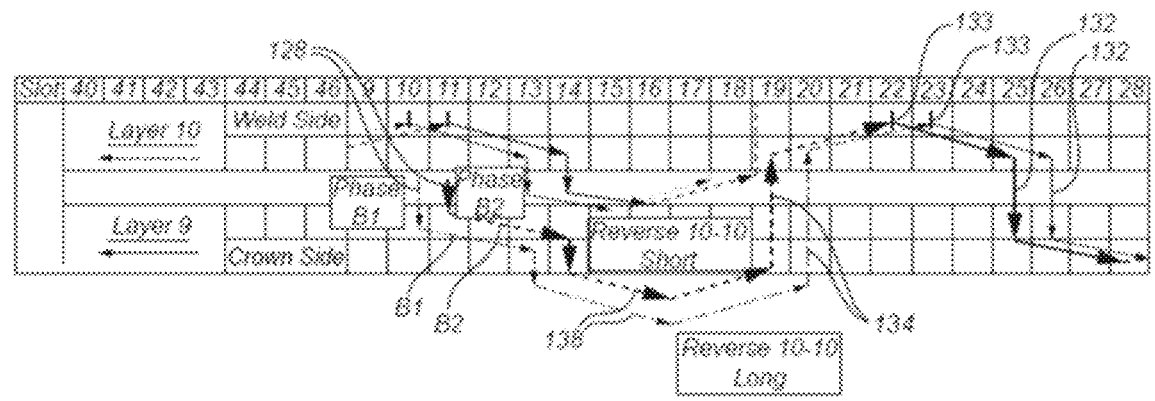
FIG. 12 is a winding diagram illustrating phase leads of the first and second phase windings in accordance with an embodiment of the present disclosure.

FIG. 11 is a winding diagram illustrating neutral leads 129 of the first and second phase windings B1, B2 in accordance with an embodiment of the present disclosure. FIG. 12 is a winding diagram illustrating phase leads 128 of the first and second phase windings B1, B2 in accordance with an embodiment of the present disclosure. Referring to FIGS. 11 and 12, in some embodiments, the winding pitch for the first and second phase windings B1 and B2 is six slots. The same-layer lead coil 138 for each of the first and second phase windings B1 and B2 are positioned at the phase ends thereof. In some embodiments, one of the legs of the same-layer lead coil 138 thereof forms the phase lead 128 for the respective phase winding B1, B2.

In the embodiment illustrated, the same-layer lead coil 138 for the first phase winding B1 includes a long pitch while the same-layer lead coil 138 for the second phase winding B2 includes a short pitch. In the embodiment illustrated in FIG. 12, the slots for each leg 132 of the same-layer lead coil 138 of the second phase winding B2 are offset by one slot relative to the slots for each leg 132 of the same-layer lead coil 138 of the first phase winding B1 such that both legs 132 of the second phase winding B2 are positioned between the legs 132 of the first phase winding B1.

Again, as can be seen in FIGS. 11 and 12, both the phase leads 128 and the neutral leads 129 are at the weld end 150 of the stator 130/stator body 135.

Figure 13:
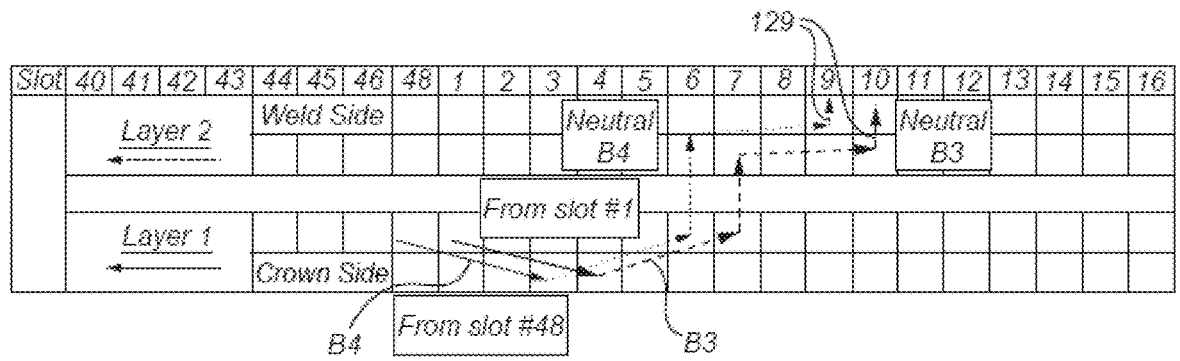
FIG. 13 is a winding diagram illustrating neutral leads of the third and fourth phase windings in accordance with an embodiment of the present disclosure.
Figure 14:
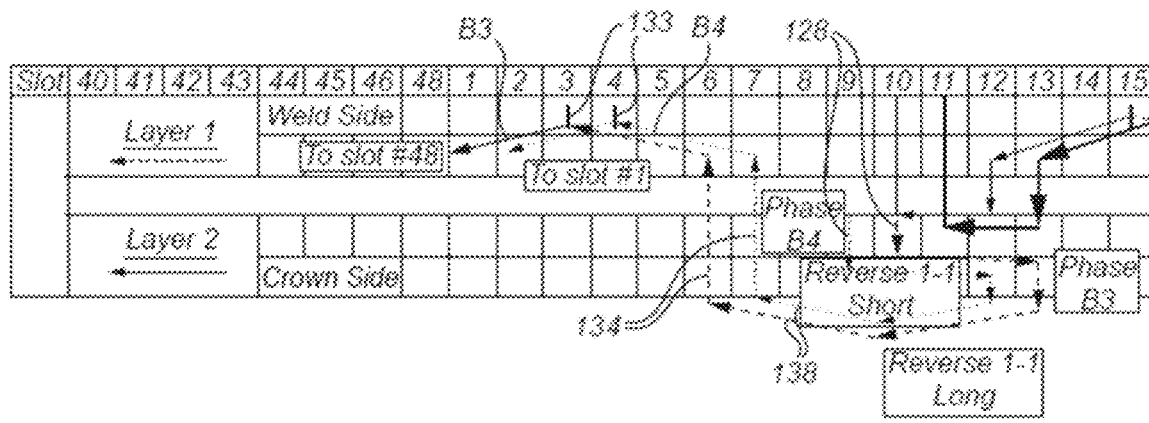
FIG. 14 is a winding diagram illustrating phase leads of the third and fourth phase windings in accordance with an embodiment of the present disclosure.

FIG. 13 is a winding diagram illustrating neutral leads 129 of the third and fourth phase windings B3, B4 in accordance with an embodiment of the present disclosure. FIG. 14 is a winding diagram illustrating phase leads 128 of the third and fourth phase windings B3, B4 in accordance with an embodiment of the present disclosure. Referring to FIGS. 13 and 14, in some embodiments, the winding pitch for the third and fourth phase windings B3 and B4 is six slots. The same-layer lead coil 138 for each of the third and fourth phase windings B3 and B4 are positioned at the phase ends thereof. In some embodiments, one of the legs of the same-layer lead coil 138 thereof forms the phase lead 128 for the respective phase winding B3, B4.

In the embodiment illustrated, the same-layer lead coil 138 for the third phase winding B3 includes a long pitch while the same-layer lead coil 138 for the fourth phase winding B2 includes a short pitch. In the embodiment illustrated in FIG. 14, the slots for each leg 132 of the same-layer lead coil 138 of the fourth phase winding B4 are offset by one slot relative to the slots for each leg 132 of the same-layer lead coil 138 of the third phase winding B3 such that both legs 132 of the fourth phase winding B4 are positioned between the legs 132 of the third phase winding B3.

Again, as can be seen in FIGS. 13 and 14, both the phase leads 128 and the neutral leads 129 are at the weld end 150 of the stator 130/stator body 135.

While FIGS. 7-14 describe embodiments of the phase windings B1-B4 for phase B of the windings 131 of the motor stator 130, in various embodiments, the phase windings A1-A4 for phase A and the phase windings C1-C4 for phase C are similarly configured to include windings 131 with phase segments 138, 139, phase leads 128 and neutral leads 129 at the weld end 150 of the motor stator 130/stator body 135, the same-layer lead coils 138, the same-layer jumper coil 139, and the like.

Figure 15:
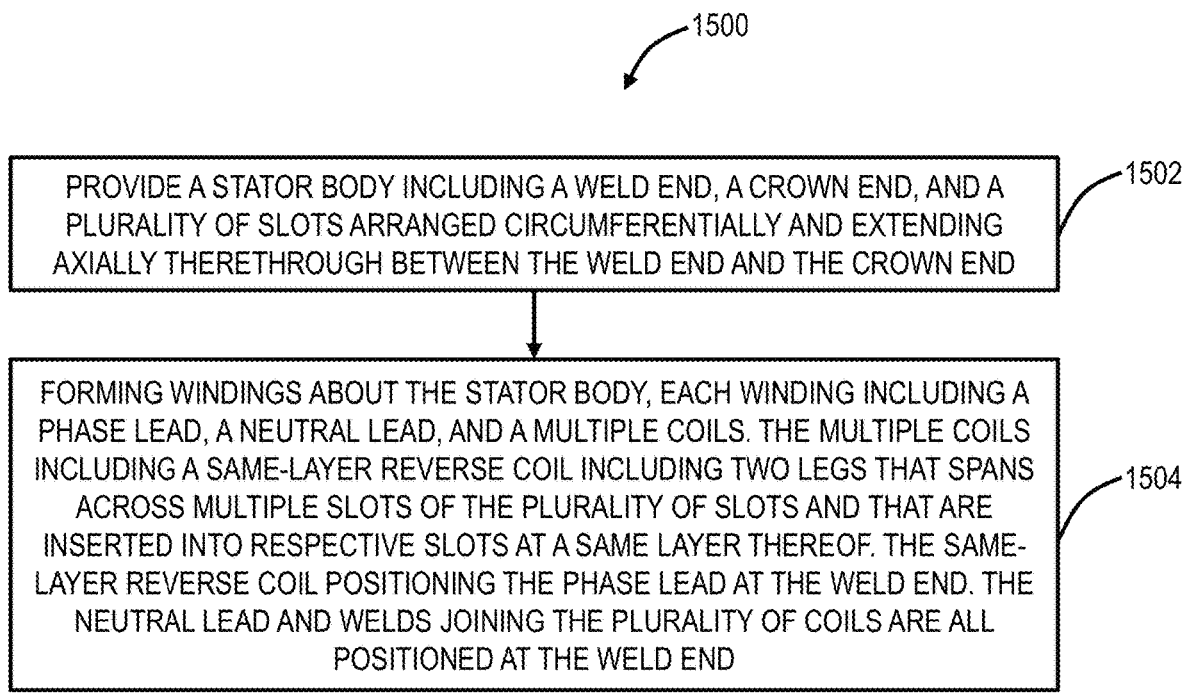
FIG. 15 is a method for assembling a motor stator for a motor.

FIG. 15 is a method 1500 for assembling a motor stator 130 for a motor 110. The method includes providing a stator body including a weld end, a crown end, and a plurality of slots arranged circumferentially and extending axially therethrough between the weld end and the crown end at step 1502. The method also includes forming windings about the stator body at step 1504. Each of the windings including a phase lead, a neutral lead, and multiple coils. The multiple coils include a same-layer lead coil including two legs that spans across multiple slots of the plurality of slots and that are inserted into respective slots at a same layer thereof. The same-layer lead coil positions the phase lead at the weld end. The neutral lead and welds joining the multiple coils are all positioned at the weld end.

In some embodiments of the method, the phase lead is at an end of a leg of the same-layer lead coil for each respective winding.

In some embodiments of the method, each respective winding includes a forward winding segment wound in a first azimuthal direction, a reverse winding segment wound in a second azimuthal direction, opposite the first azimuthal direction, and a same-layer jumper coil connecting the forward winding segment to the reverse winding segment, each leg of the same-layer jumper coil being slotted in a respective slot at a same layer thereof. In some of these embodiments, the forward winding segment and the reverse winding segment are semi-staggered, such that legs of coils for the reverse winding segment are clocked one slot relative to legs of corresponding coils for the forward winding segment.

In some embodiments of the method, the plurality of windings are arranged for multiple phases, and each phase includes a pair of windings that are semi-staggered, such that legs of coils for a first winding are clocked one slot relative to legs of corresponding coils for a second winding. In some of these embodiments, the same-layer lead coil for the first winding is a long coil and the same-layer lead coil for the second winding is a short coil, and wherein legs of the short coil are slotted between legs of the long coil at a same layer thereof.

In some embodiments, the method further includes positioning a busbar at the weld end and forming the connections thereto at the weld end. In these embodiments, the phase lead and the neutral lead welds for each of the plurality of windings is formed at the weld end such that all welds of the motor stator are formed at the weld end.

Figure 16:
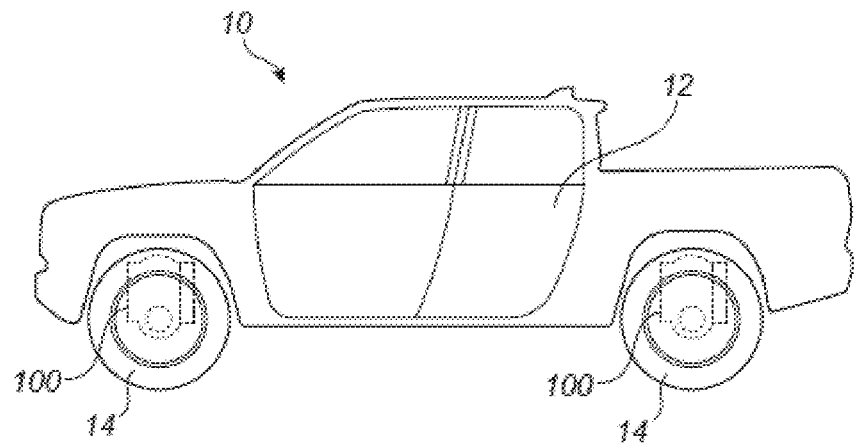
FIG. 16 is a schematic diagram of one illustrative embodiment of a vehicle of the present disclosure.

FIG. 16 is a schematic diagram of one illustrative embodiment of a vehicle 10 of the present disclosure. Referring now to FIG. 16, in various embodiments the vehicle 10 includes a vehicle body 12 and at least one wheel 14 coupled to the vehicle body 12 that is adapted to be driven by at least one e-axle 100 of the present disclosure, including the motor stator 130 and the motor rotor 120 that is coupled to a drivetrain for the at least one wheel 14. For example, as depicted in FIG. 2, the motor rotor 120 is configured to rotate relative to the motor stator 130.

Figure 17:
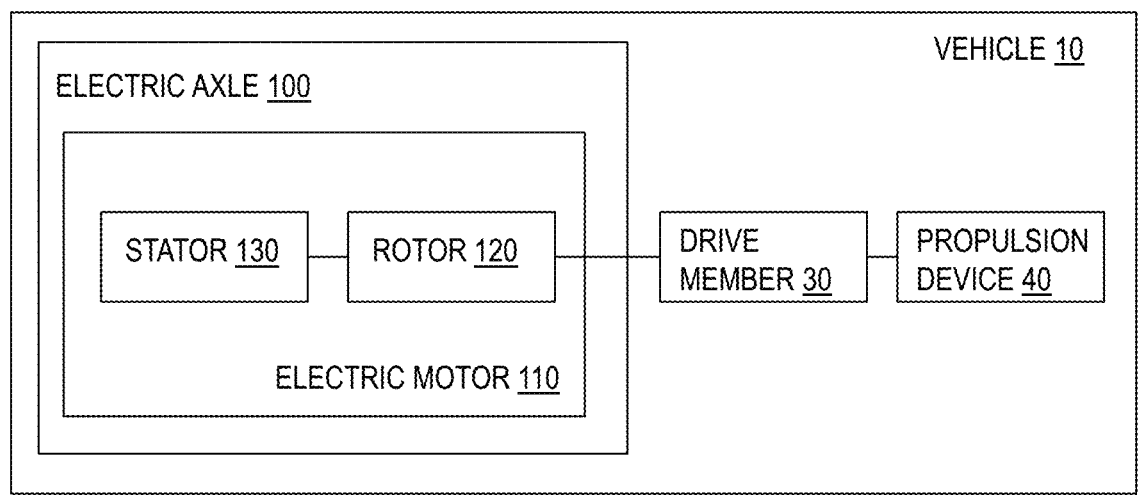
FIG. 17 is a block diagram of another illustrative embodiment of a vehicle of the present disclosure.

FIG. 17 is a block diagram of another illustrative embodiment of a vehicle 10 of the present disclosure. Referring to FIG. 17, in various embodiments an illustrative vehicle 10 includes at least one drive member 30, at least one propulsion device 40, and at least one e-axle 100. In embodiments, the at least one drive member 30 is integral to the e-axle 100. The at least one propulsion device 40 is coupled to the at least one drive member 30. The electric motor 110 includes the motor stator 130 having all welds for the windings on a single side thereof and a motor rotor 120 configured to rotate relative to the motor stator 130. The motor rotor 120 is coupled to the at least one drive member 30.

It will be appreciated that the vehicle 10 can be any type of vehicle whatsoever as desired without limitation. Given by way of non-limiting example, in various embodiments the vehicle 10 may be an electric vehicle (that is, an all-electrically driven vehicle) or a hybrid vehicle. For example, and given by way of non-limiting examples, in various embodiments the vehicle 10 may include a motor vehicle driven by wheels, such as the vehicle 10 illustrated in FIG. 16, and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 10 may include a marine vessel such as, without limitation, a boat, a ship, a submarine, a submersible, an autonomous underwater vehicle (AUV), and the like. Given by way of further non-limiting examples, in various embodiments the vehicle 10 may include an aircraft such as, without limitation, a fixed wing aircraft, a rotary wing aircraft, and a lighter-than-air (LTA) craft.

In various embodiments the e-axle (or e-axles) 100 are configured to drive the vehicle 10 via the corresponding electric motor(s) 110 thereof. That is, in various embodiments the e-axle (or e-axles) 100 may drive any drive member 30 that drives any propulsion device 40, such as without limitation a wheel or wheels, a track or tracks, a propellor or propellors, a propulsor or propulsors, a rotor or rotors, or the like, associated with the vehicle 10.

For example, in some embodiments in a motor vehicle one e-axle 100 and its corresponding electric motor 110 may be configured to drive one drive member 30 such as an axle or a chain ring that drives one wheel or track, in some other embodiments in a motor vehicle one e-axle 100 and its corresponding electric motor 110 may be configured to drive an axle that rotates two wheels or two tracks, and in some other embodiments in a motor vehicle one e-axle 100 and its corresponding electric motor 110 may be configured to drive an axle that rotates one wheel or one track and another e-axle 100 and its corresponding electric motor 110 is configured to drive another axle that rotates another wheel or another track.

Similarly, in some embodiments in a marine vessel one e-axle 100 and its corresponding electric motor 110 may be configured to drive one propeller or propulsor, in some other embodiments in a marine vessel one e-axle 100 and its corresponding electric motor 110 may be configured to drive a shaft that rotates two propellers or two propulsors, and in some other embodiments in a marine vessel one e-axle 100 and its corresponding electric motor 110 may be configured to drive a shaft that rotates one propeller or propulsor and another e-axle 100 and its corresponding electric motor 110 may be configured to drive another shaft that rotates another propeller or propulsor.

Likewise, in some embodiments in an aircraft one e-axle 100 and its corresponding electric motor 110 may be configured to drive one propeller or rotor, in some other embodiments in an aircraft one e-axle 100 and its corresponding electric motor 110 may be configured to drive a shaft that rotates two propellers or two rotors, and in some other embodiments in an aircraft one e-axle 100 and its corresponding electric motor 110 may be configured to drive a shaft that rotates one propeller or rotor and another e axle 100 and its corresponding electric motor 110 may be configured to drive another shaft that rotates another propeller or rotor.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A motor stator for a motor, comprising:
    a stator body including a weld end, a crown end, and a plurality of slots arranged circumferentially and extending axially therethrough between the weld end and the crown end; and
    a plurality of windings each winding including a phase lead, a neutral lead, and a plurality of coils, the plurality of coils including a same-layer lead coil that spans across multiple slots of the plurality of slots and includes two legs that are inserted into respective slots at a same layer thereof, the same-layer lead coil positioning the phase lead at the weld end, wherein the neutral lead and welds joining the plurality of coils are all positioned at the weld end, wherein each respective winding includes a forward winding segment wound in a first circumferential direction, a reverse winding segment wound in a second circumferential direction, opposite the first circumferential direction, and a same-layer jumper coil connecting the forward winding segment to the reverse winding segment, each leg of the same-layer jumper coil being slotted in a respective slot at a same layer thereof.

2. The motor stator of claim 1, wherein the phase lead is at an end of a leg of the same-layer lead coil for each respective winding.

3. The motor stator of claim 1, wherein the forward winding segment and the reverse winding segment are semi-staggered, such that legs of coils for the reverse winding segment are clocked one slot relative to legs of corresponding coils for the forward winding segment.

4. The motor stator of claim 1, wherein the plurality of windings are arranged for multiple phases, and each phase includes a pair of windings that are semi-staggered, such that legs of coils for a first winding are clocked one slot relative to legs of corresponding coils for a second winding.

5. The motor stator of claim 4, wherein the same-layer lead coil for the first winding is a long coil and the same-layer lead coil for the second winding is a short coil, and wherein legs of the short coil are slotted between legs of the long coil at a same layer thereof.

6. The motor stator of claim 1, further comprising a busbar positioned at the weld end, wherein the phase lead and the neutral lead welds for each of the plurality of windings is formed at the weld end such that all welds of the motor stator are formed at the weld end.

7. An electric axle, comprising:
a motor including
a motor rotor, and
a motor stator configured to induce rotation of the motor rotor, the motor stator including:
a stator body including a weld end, a crown end, and a plurality of slots arranged circumferentially and extending axially therethrough between the weld end and the crown end; and
a plurality of windings each winding including a phase lead, a neutral lead, and a plurality of coils, the plurality of coils including a same-layer lead coil that spans across multiple slots of the plurality of slots and includes two legs that are inserted into respective slots at a same layer thereof, the same-layer lead coil positioning the phase lead at the weld end, wherein the neutral lead and welds joining the plurality of coils are all positioned at the weld end; and
a drive member coupled to the motor rotor, wherein each respective winding includes a forward winding segment wound in a first circumferential direction, a reverse winding segment wound in a second circumferential direction, opposite the first circumferential direction, and a same-layer jumper coil connecting the forward winding segment to the reverse winding segment, each leg of the same-layer jumper coil being slotted in a respective slot at a same layer thereof.

8. The electric axle of claim 7, wherein the phase lead is at an end of a leg of the same-layer lead coil for each respective winding.

9. The electric axle of claim 7, wherein the forward winding segment and the reverse winding segment are semi-staggered, such that legs of coils for the reverse winding segment are clocked one slot relative to legs of corresponding coils for the forward winding segment.

10. The electric axle of claim 7, wherein the plurality of windings are arranged for multiple phases, and each phase includes a pair of windings that are semi-staggered, such that legs of coils for a first winding are clocked one slot relative to legs of corresponding coils for a second winding.

11. The electric axle of claim 10, wherein the same-layer lead coil for the first winding is a long coil and the same-layer lead coil for the second winding is a short coil, and wherein legs of the short coil are slotted between legs of the long coil at a same layer thereof.

12. The electric axle of claim 7, further comprising a busbar positioned at the weld end, wherein the phase lead and the neutral lead welds for each of the plurality of windings is formed at the weld end such that all welds of the motor stator are formed at the weld end.

13. A vehicle, comprising:
an electric axle including
a motor rotor, and
a motor stator configured to induce rotation of the motor rotor, the motor stator including:
a stator body including a weld end, a crown end, and a plurality of slots arranged circumferentially and extending axially therethrough between the weld end and the crown end; and
a plurality of windings each winding including a phase lead, a neutral lead, and a plurality of coils, the plurality of coils including a same-layer lead coil that spans across multiple slots of the plurality of slots and includes two legs that are inserted into respective slots at a same layer thereof, the same-layer lead coil positioning the phase lead at the weld end, wherein the neutral lead and welds joining the plurality of coils are all positioned at the weld end; and
a wheel coupled to the electric axle and configured to be driven thereby, wherein each respective winding includes a forward winding segment wound in a first circumferential direction, a reverse winding segment wound in a second circumferential direction, opposite the first circumferential direction, and a same-layer jumper coil connecting the forward winding segment to the reverse winding segment, each leg of the same-layer jumper coil being slotted in a respective slot at a same layer thereof.

14. The vehicle of claim 13, wherein the phase lead is at an end of a leg of the same-layer lead coil for each respective winding.

15. The vehicle of claim 13, wherein the forward winding segment and the reverse winding segment are semi-staggered, such that legs of coils for the reverse winding segment are clocked one slot relative to legs of corresponding coils for the forward winding segment.

16. The vehicle of claim 13, wherein the plurality of windings are arranged for multiple phases, and each phase includes a pair of windings that are semi-staggered, such that legs of coils for a first winding are clocked one slot relative to legs of corresponding coils for a second winding.

17. The vehicle of claim 16, wherein the same-layer lead coil for the first winding is a long coil and the same-layer lead coil for the second winding is a short coil, and wherein legs of the short coil are slotted between legs of the long coil at a same layer thereof.

\* \* \* \* \*